United States Patent [19]

Barlow

[11] 4,225,955

[45] Sep. 30, 1980

[54] THIN DISK ACOUSTIC BAFFLE SYSTEM

[75] Inventor: Michael L. Barlow, Silverdale, Wash.

[73] Assignee: The United States of America as represented by the Secretary of the Navy, Washington, D.C.

[21] Appl. No.: 967,198

[22] Filed: Dec. 7, 1978

[51] Int. Cl.[3] .............................................. H04B 11/00

[52] U.S. Cl. .......................................... 367/131; 367/2; 181/206

[58] Field of Search ............... 181/139, 140, 175, 198, 181/206, 296; 340/3 E, 5 R; 367/2, 131

[56] References Cited

U.S. PATENT DOCUMENTS 2,457,527 12/1948 Bruce .................................. 181/175

*Primary Examiner*—Richard A. Farley

*Attorney, Agent, or Firm*—R. S. Sciascia; Charles D. B. Curry

[57] ABSTRACT

A thin disk acoustic baffle comprising a thin disk of material having a unique combination of acoustical properties and dimensions to provide optimum attenuation of sound transmission between two points. Optimum sound attenuation is achieved by adjusting the thickness, diameter, and location of the thin disk relative to one of the points to be baffled and by selecting the material of the disk to have acoustic properties such that sound waves diffracted around the edges of the disk cancel the direct waves transmitted through the disk at a particular frequency of interest.

2 Claims, 7 Drawing Figures

THIN DISK ACOUSTIC BAFFLE SYSTEM

BACKGROUND OF THE INVENTION

1. Field of the Invention.

The present invention relates to an acoustic baffle system and more particularly to a thin disk acoustic baffle system.

2. Description of Prior Art.

There has been a continuing requirement for physical techniques for blocking the reception or transmission of sound in the axial direction between two points. An example of such a requirement is where a sonar projector and hydrophone are mounted coaxially in an acoustic transponder system. Baffles have been previously used to prevent or reduce axial sound transmission from the projector to the hydrophone but optimum criteria for locating and designing such baffles has not been available. The present invention overcomes these difficulties by providing optimum sound attenuation with a baffle system having a unique set of dimension and acoustic characteristics.

SUMMARY OF THE INVENTION

Briefly, the present invention comprises a thin disk of material having a unique combination of acoustical properties and dimensions to provide optimum attenuation of sound transmission between two points. Optimum sound attenuation is achieved by adjusting the thickness, diameter, and location of the thin disk relative to one of the points to be baffled and by selecting the material of the disk to have acoustic properties such that sound waves diffracted around the edges of the disk cancel the direct waves transmitted through the disk at a particular frequency of interest.

STATEMENT OF THE OBJECTS OF THE INVENTION

An object of the present invention is to provide a thin disk acoustic baffle system;

Another object is to provide a method for isolating an acoustic receiver from an acoustic transmitter;

Still another object of the present invention is to provide a thin disk acoustic baffle for isolating a receiver in sea water involving a unique diameter, thickness and material for a particular frequency;

Other objects, advantages and novel features of the invention will become apparent from the following detailed description of the invention when considered in conjunction with the accompanying drawings wherein:

DESCRIPTION OF THE PREFERRED EMBODIMENT

Figure 1:
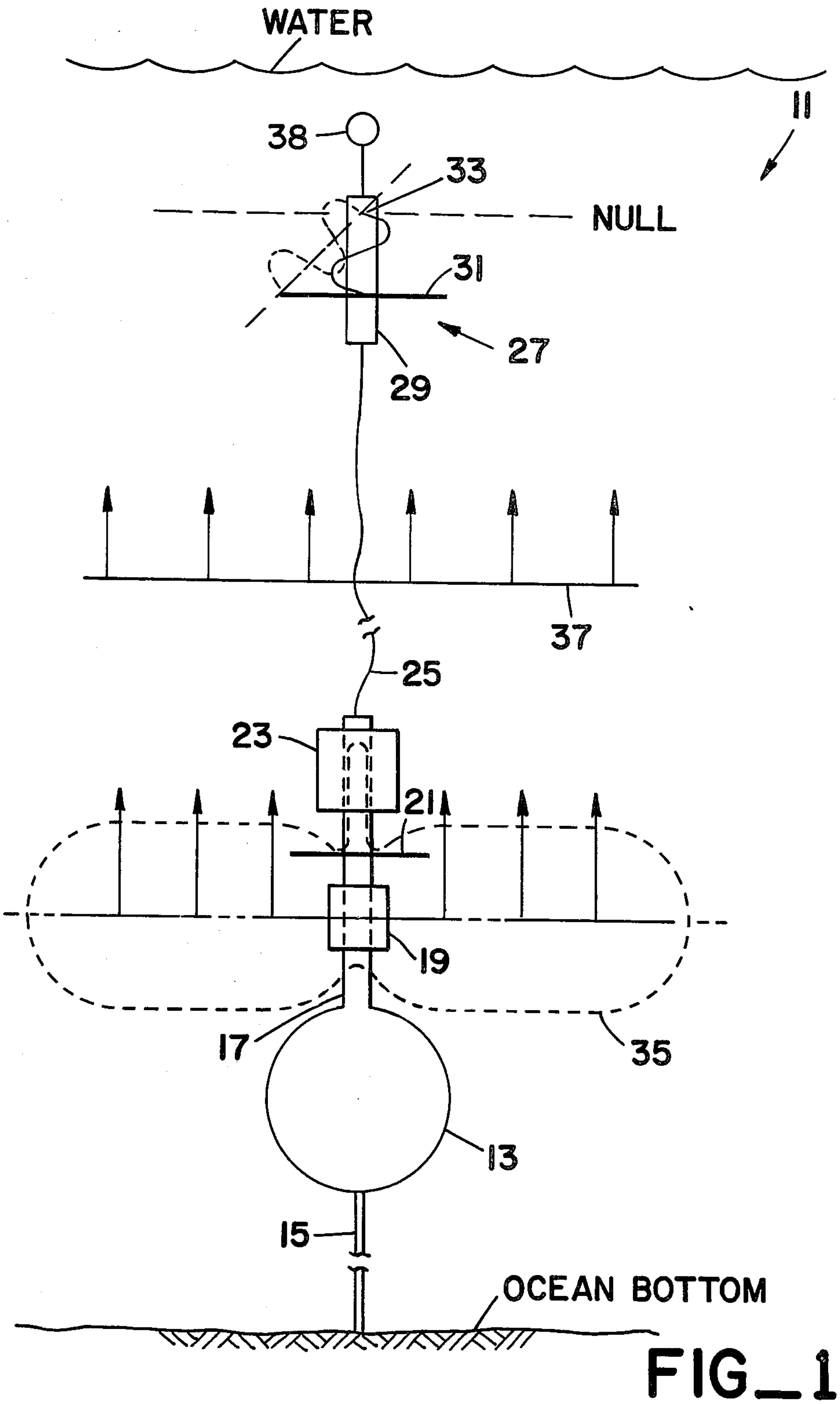
FIG. 1 is a schematic drawing of an overall transmission/receiver system in which the present invention is used.

In FIG. 1 is illustrated an overall underwater acoustic system 11 employing the thin disk acoustic baffle technique of the present invention. This underwater acoustic system includes a buoyant sphere 13 that is attached to the ocean bottom by means of a cable 15. Attached to the sphere by member 17 is an acoustic transmitter 19, an acoustic baffle 21 and electronic equipment section 23. Buoyantly suspended from support element 17 by cable 25 is acoustic receiver section 27. Acoustic receiver section 27, includes an equipment section 29, acoustic baffle 31, float section 38 and acoustic receiver 33. In FIG. 1 is shown the directional characteristics of the beam 35 emitted from transmitter 19. The beam is generally toroidal in shape and primarily radiates outward at a beam angle O. A strong axial component is also generated due to acoustic reflections from the sphere 13. The function of this system is to receive an acoustic pulse and have an electronic system process this received pulse and acoustically retransmit the processed pulse with transmitter 19. Beam 35 will also directly radiate substantial acoustic energy towards the receiver 33 as indicated by acoustic wave 37.

In underwater sonar detection systems it is necessary to provide acoustic isolation of the transmitter from the receiver. That is, it is necessary to minimize the effect of acoustic wave 37 on receiver 33. For a variety of complex reasons, both technical and economic, there are size, material, power, and distance constraints on these underwater systems. For example, the isolation of the transmitter from the receiver could be effectively achieved by using very large baffles or by spacing the transmitter and receiver very far apart. However, it is generally necessary to limit the baffle size to a maximum of about 18 inches in diameter and to limit the maximum distance between the transmitter and receiver to about 15 feet. The circular symmetry of the system generally limits the effectiveness of large baffles as the diffracted waves around the edges of the baffle will reconverge at the receiver in phase. Within these general constraints the present invention provides an acoustic baffle technique that has been found to be very effective by using small diameter baffles and a unique signal cancellation (rather than signal isolation) technique. To better understand this invention the following theoretical analysis is presented.

Figure 2A:
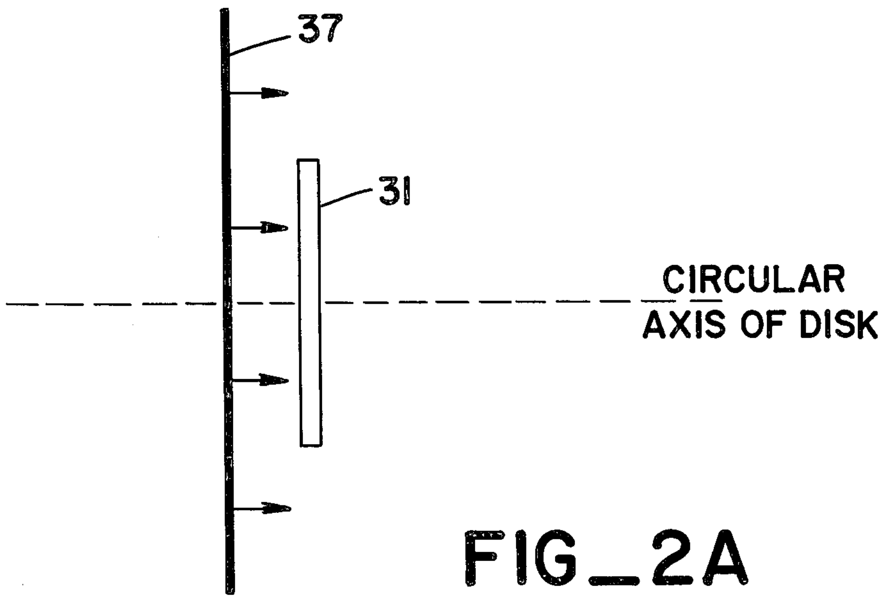
FIGS. 2A and 2B are schematic drawings of the waveform characteristics respectively before and after the propagating waveform impinges upon the thin disk.
Figure 2B:
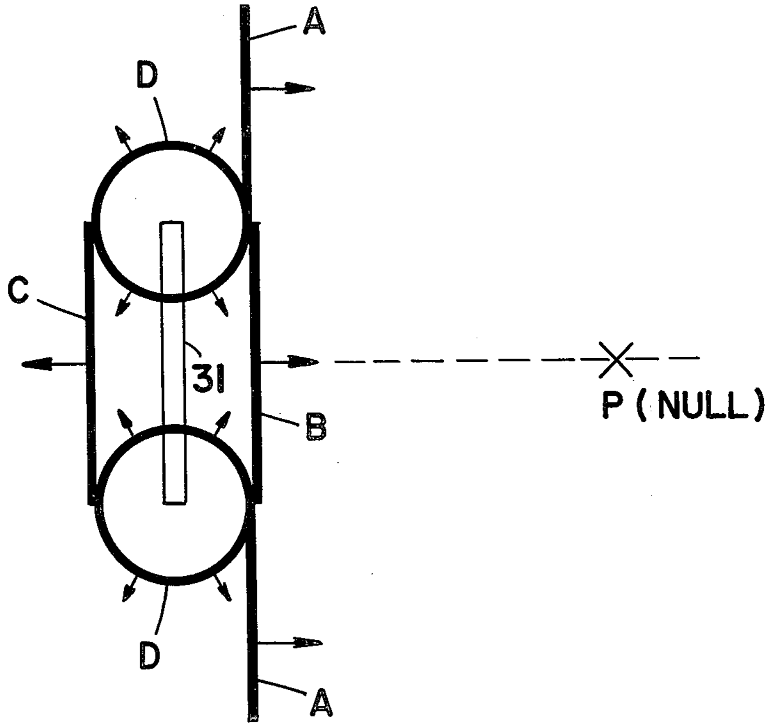

In FIG. 2A are shown circular disk 31 and acoustic wave 37 which are equivalent to the same disk and wave shown in the FIG. 1 system. The acoustic wave 37 is shown propagating from left to right towards disk 31. In FIG. 2B are shown the same circular disk 31 and the various components of acoustic wave 37 after it has impinged upon the disk.

Figure 3:
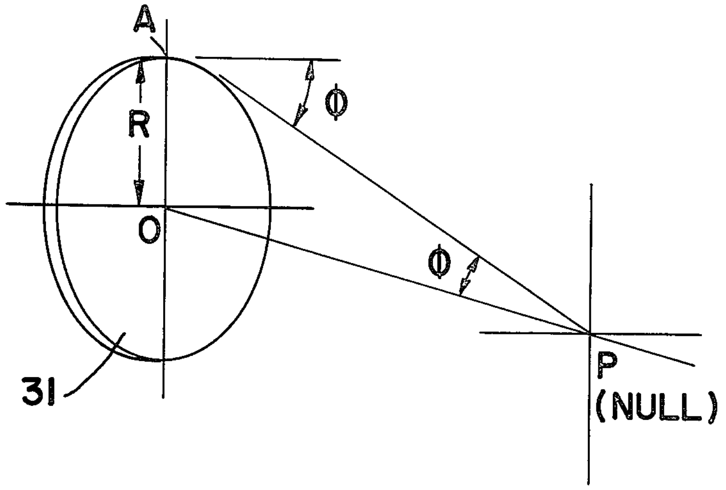
FIG. 3 is a drawing showing the geometry of the thin disk and the acoustic null location.

The present invention expands upon the Thomas Young's theory of diffractions: "A diffraction pattern is the resultant of the unperturbed incident beam and reradiated Huygen's wavelets from points on the edge of the aperture.", "Optics of the Electromagnetic Spectrum" p. 300, by C. L. Andrews, Prentice Hall. This invention expands the previously derived equations, which apply to the diffraction pattern of a circular hole in an infinite absorbing plane, to the case of finite circular plate. It has been found that in the case of finite real materials, the plate will act both as a reflector and a transmitter rather than an absorber. It has been discovered that several definable phenomenon occur immediately after the original wavefront 37 strikes the disk. First, the original unmodified wavefront 37 of FIG. 2A continues its propagation as wavefront A with a circular disk cut out of its center as shown in FIG. 2B. Within this cutout zone is a disk shaped acoustic wavefront B which has been transmitted through the disk 31. This wavefront is characterized by amplitude $A_o\alpha_t$; where $\alpha_t$ is the complex sound amplitude reflection coefficient of the disk material. Also, there is another disk shaped wavefront C traveling backward which has been reflected from the disk 31. This reflected wavefront is characterized by amplitude $A_o\alpha_r$; where $\alpha_r$ is the complex sound amplitude reflection coefficient of the disk material. Finally, there is a torroidal shaped diffraction wavefront D consisting of Huygen's defined wavelets spreading from the edges of disk 31. This diffraction wavefront contains components from wavefronts A, B and C as a result of the common origin of these wavefronts at the edges of the disk. It has been found that a point P on the circular axis of the disk will only receive radiation from transmitted wavefront B and the diffracted wavefront D. FIG. 3 shows the geometry for calculating the amplitude of the diffracted wave received at point P. If point P is distance S away from disk 31 along the circular axis of the disk, the amplitude of the diffracted component due to the transmitted wave through the disk 31 will be defined as follows:

$$A_B = -\tfrac{1}{2}\left(1 + \frac{S}{\sqrt{S^2 + R^2}}\right) A_o\alpha_t \qquad (1)$$

where:

- $A_B$—amplitude of diffracted component of wavefront B
- $A_o$—original amplitude
- $\alpha_t$—complex sound amplitude transmission coefficient of the disk material.

The term $A_B$ is negative as it represents energy scattered out of the original wave impulse B.

The diffracted component due to the unmodified plane wave A will be:

$$A_A = \tfrac{1}{2}\left(1 + \frac{S}{\sqrt{S^2 + R^2}}\right)A_o \qquad (2)$$

where:

- $A_A$—amplitude of diffracted component of wavefront A.

The term $A_A$ is positive as it represents energy scattered into the zone of wavefront B from that of wavefront A.

The diffracted component due to the reflected wavefront C will be:

$$A_C = \tfrac{1}{2}\left(1 - \frac{S}{\sqrt{S^2 + R^2}}\right)A_o\alpha_r \qquad (3)$$

where:

- $A_c$—amplitude of diffracted component of wavefront C
- $\alpha_r$—complex sound amplitude reflection coefficient of the disk material.

The term $A_c$ is also positive as it represents energy scattered around the zone of wavefront B from that of wavefront C.

These terms are then combined into one equation to represent the total diffracted component observed at P: $A_D=A_A+A_B+A_C$ where:

$$A_D = \tfrac{1}{2}\left[(1 + \alpha_r + \alpha_t) + (1 - \alpha_t - \alpha_r)\left(\frac{S}{\sqrt{S^2 + R^2}}\right)\right]A_o \qquad (4)$$

The diffracted wave $A_D$ travels path AP indicated on FIG. 3.

The direct wavefront B travels path OP. The amplitude of this component is:

$$A_{B(Direct)}=A_o\alpha_t \qquad (5)$$

Figure 4:
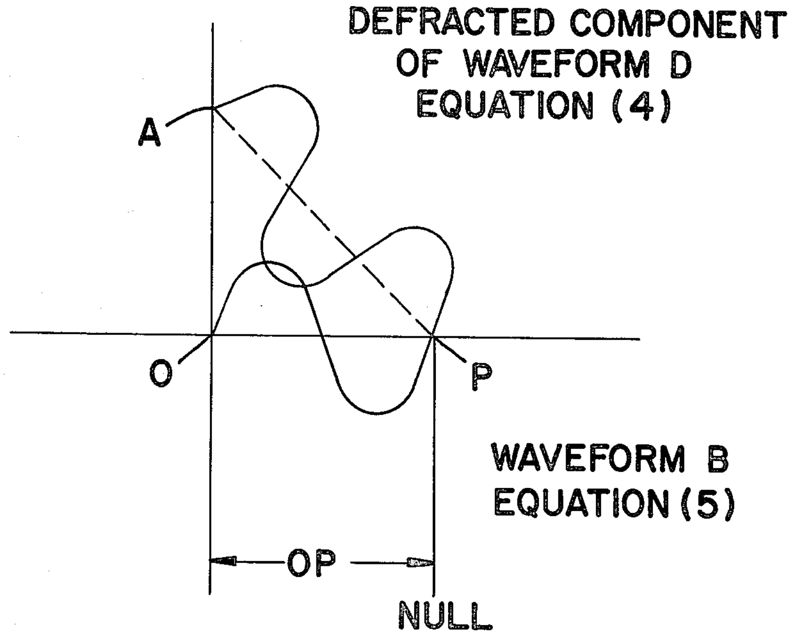
FIG. 4 is a diagram of the component and direct waveform interacting at the acoustic null position.

It has been found that the optimum acoustic baffle effect occurs when the diffracted component of waveform D of FIG. 2B as defined in equation (4) arrives at point P at approximately equal amplitude and opposite in phase as that of waveform B of FIG. 2B as defined in equation (5). This is graphically shown in FIGS. 1 and 4. Nulls will be generally observed at those frequencies where distance OP is an odd multiple of a half wavelength different from distance AP. The broadest null in terms of percentage bandwidth of center frequency is obtained when this distance, $(\sqrt{S^2+R^2})-A$, is one-half wavelength. In most applications, this will be the best configuration. All of these equations apply only to points on the axis of the disk. It has been found, however, that good results can be obtained for transducers having a nonzero physical diameter if the physical diameter is less than a wavelength and if the effective diameter of the transducer is subtracted from that of the disk in applying the equations above.

Figure 5:
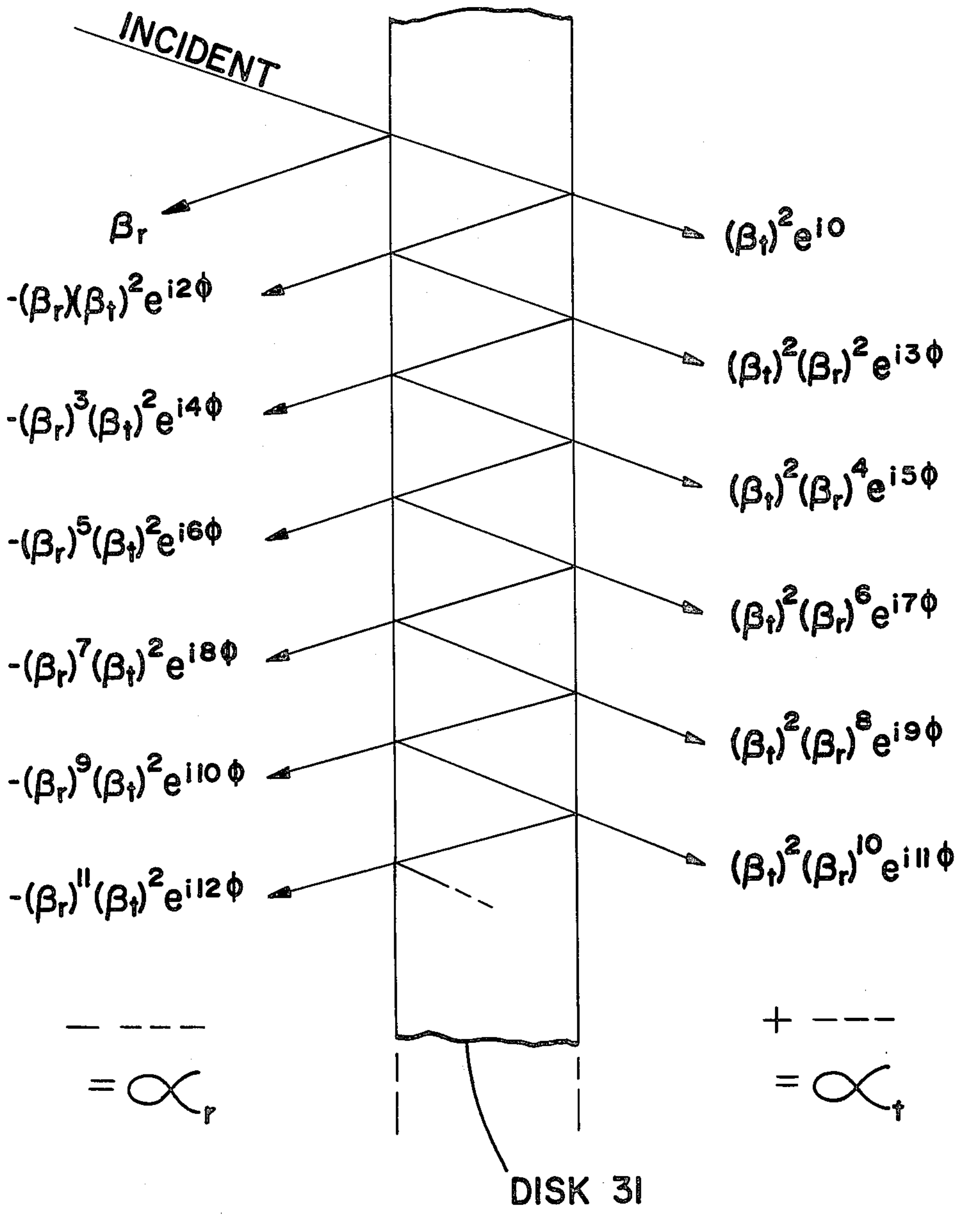
FIG. 5 is an illustration of the format for calculation of the transmission and reflection coefficients.

The sound amplitude (not Power) transmission and reflection coefficients, $\alpha_t$ and $\alpha_r$ respectively, are calculated as complex numbers involving the thickness of the disk. If the acoustic impedance of the material of the disk is $Z_2=P_2C_2$ and the acoustic impedance of the acoustic fluid medium in which the disk is immersed is $Z_1=P_1C_1$, then the single interface transmission coefficient is:

$$\beta_t = \frac{2\sqrt{Z_1Z_2}}{Z_1 + Z_2} \qquad (6)$$

for transmission from the fluid medium to the disk or from the disk to the fluid medium. The single interface reflection coefficient is:

$$\beta_r = \frac{Z_2 - Z_1}{Z_1 + Z_2} \qquad (7)$$

for incident waves in the fluid medium reflected from the disk and $-\beta_r$ for waves in the disk reflected from the fluid medium. In order to calculate the values of $\alpha_t$ and $\alpha_r$, it is necessary to take into account the multiple reflections which occur in the disk. FIG. 5 illustrates the process which occurs. The calculations are for normal incidence; however, the incident beam is shown slanted to make the multiple reflections apparent. $\phi$ is the phase shift which occurs during a single transit of the plate or disk as defined by the relation:

$$\phi = \frac{t}{c_2} \qquad (8)$$

Where t is the thickness of the plate and $C_2$ is the sound propagation velocity of the plate or disk material. The multiple reflections which occur in the disk generate an infinite series of the form as defined by the relation:

$$W = \sum_{n=0}^{n=\infty} (\beta_r^2 e^{i2\phi})^n \qquad (9)$$

By converting this geometric series to its final summed form the following complex quantity is obtained:

$$W = \frac{1}{1 - \beta_r^2 e^{i2\phi}} \qquad (10)$$

The effective transmission and reflection coefficients for the plate or disk are as follows:

$$\alpha_t = \beta_t^2 e^{i\phi w} \qquad (11)$$

$$\alpha_r = \beta_r - \beta_r^2 e^{i2\phi w} \qquad (12)$$

The attenuation may be defined as:

Attenuation ($db$) = (13)

-continued $$10 \log \left[ \frac{A_D^2 + A_B^2}{A_O^2} + \frac{2A_D A_B \cos\left( \frac{2\pi(\sqrt{S^2 + R^2} - S^2)}{\lambda} \right)}{A_O^2} \right]$$

Figure 6:
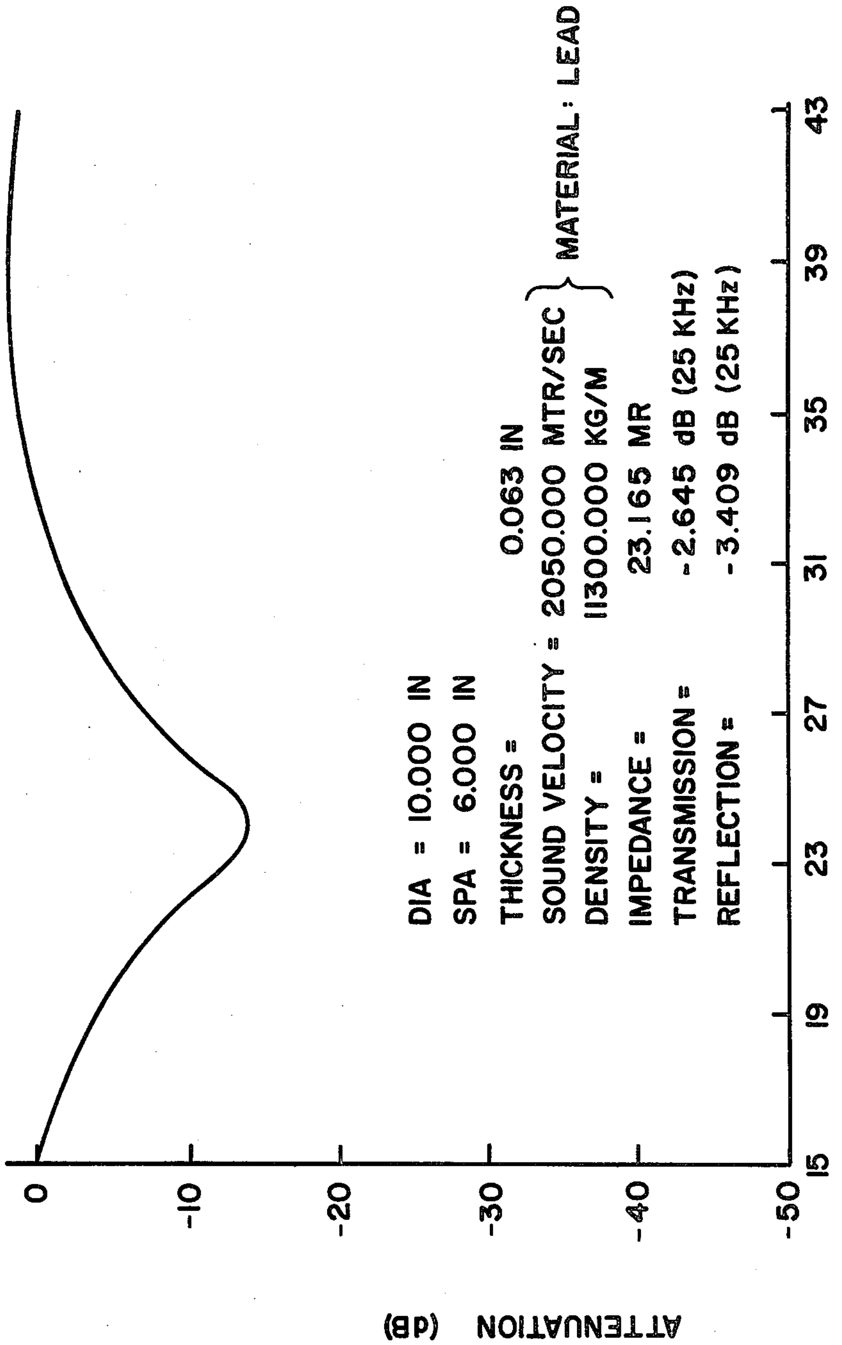
FIG. 6 is a diagram of the frequency and attenuation characteristics for a typical thin disk calculation.

A plot of attenuation verses frequency of transmission is shown in FIG. 6. From this it can be seen that the null is obtained at about 25 $KH_z$. Therefore, the characteristics of this example of the baffle system are:

Diameter of baffle minus hydrophone diameter—10 inches
Actual Baffle diameter—12 inches
Distance of baffle from receiver (null)—6 inches
Thickness of baffle—0.063 inches
Material of baffle=lead
Frequency of transmitter—25 KHz Due to the reciprocity theorem the foregoing analysis may also be applied to the case of locating a baffle near an acoustic transmitter to prevent radiation of acoustic waves in a specific direction.

What is claimed is:

1. The method of reducing or preventing the reception of acoustic waves in a single given direction at a specific frequency by an acoustic receiver by interposing a thin circular solid disk between said receiver and the source of said acoustic waves where the diameter, the thickness, the material, and the location relative to the receiver of said disk have been selected to be in the proper relationships with each other to achieve a condition whereby the acoustic waves diffracted around said disk cancel the direct waves transmitted through said disk at the location of said receiver.

2. A thin disk acoustic baffle system for isolating a receiver in sea water from a waveform having a frequency of 25 KHz comprising:

(a) a thin disk having a diameter of about 12 inches, a thickness of about 0.063 inches and made of lead; and (b) said receiver positioned along the center axis of said disk and about 6 inches behind said disk.

* * * * *